United States Patent
Goodjohn et al.

(10) Patent No.: US 10,273,948 B1
(45) Date of Patent: Apr. 30, 2019

(54) METHOD FOR OPERATING A COMPRESSOR

(71) Applicants: Haier US Appliance Solutions, Inc., Wilmington, DE (US); University of Louisville Research Foundation, Inc., Louisville, KY (US)

(72) Inventors: Paul Goodjohn, Crestwood, KY (US); Joseph Wilson Latham, Louisville, KY (US); Michael Lee McIntyre, Louisville, KY (US)

(73) Assignees: Haier US Appliance Solutions, Inc., Wilmington, DE (US); University of Louisville Research Foundation, Inc., Louisville, KY (US)

( * ) Notice: Subject to any disclaimer, the term of this patent is extended or adjusted under 35 U.S.C. 154(b) by 0 days.

(21) Appl. No.: 15/921,801

(22) Filed: Mar. 15, 2018

(51) Int. Cl.
*F04B 35/04* (2006.01)
*F04B 49/06* (2006.01)
*H02P 21/18* (2016.01)
*F04B 49/20* (2006.01)

(52) U.S. Cl.
CPC ............. *F04B 35/04* (2013.01); *F04B 49/06* (2013.01); *F04B 49/20* (2013.01); *H02P 21/18* (2016.02); *F04B 2201/1201* (2013.01); *F04B 2201/1202* (2013.01); *F25B 2600/027* (2013.01)

(58) Field of Classification Search
CPC ...... H02P 1/04; H02P 1/26; H02P 1/46; H02P 5/00; H02P 6/00; H02P 6/001; H02P 6/04; H02P 6/06; H02P 6/08; H02P 6/10; H02P 21/00; H02P 27/04; H02P 27/06; H02P 21/0003; H02P 21/0017; H02P 21/0021; H02P 23/00; H02P 27/00
USPC ......... 318/400.01, 400.02, 400.14, 700, 701, 318/727, 779, 799, 800, 801, 430, 432; 417/1, 5, 56, 60, 62
See application file for complete search history.

(56) References Cited

U.S. PATENT DOCUMENTS 7,180,263 B2 * 2/2007 Maeda .................... H02P 6/085
318/701

FOREIGN PATENT DOCUMENTS

EP 3098449 A1 11/2016
JP 2006304452 A 11/2006

* cited by examiner

*Primary Examiner* — Antony M Paul
(74) *Attorney, Agent, or Firm* — Dority & Manning, P.A.

(57) ABSTRACT

A method of operating a compressor includes obtaining a harmonic series representation of speed variation as the rotor rotates through each revolution. The method includes regulating an electric motor to compensate for or cancel out the periodic speed variation. Specifically, the method includes calculating an electromagnetic torque using a torque control input model based on the speed error and the harmonic series representation of the speed error. The operation of the electric motor is then adjusted such that the electromagnetic torque applied by the motor cancels out the speed variation such that noise and vibrations are minimized.

19 Claims, 6 Drawing Sheets

METHOD FOR OPERATING A COMPRESSOR

FIELD OF THE INVENTION

The present subject matter relates generally to compressors and associated methods of operation, and more particularly, to methods for operating a rolling piston compressor using an adaptive load torque observer for compensating for periodic load torques.

BACKGROUND OF THE INVENTION

Certain conventional air conditioning and refrigeration systems use sealed systems to move heat from one location to another. Certain sealed systems may perform either a refrigeration cycle (e.g., to perform a cooling operation in an appliance such as a refrigerator) or a heat pump cycle (e.g., to heat an indoor room) depending on the appliance and the desired direction of heat transfer. However, the operating principles of both cycles or modes of operation are identical.

Specifically, sealed systems include a plurality of heat exchangers coupled by a fluid conduit charged with refrigerant. A compressor continuously compresses and circulates the refrigerant through the heat exchangers and an expansion device to perform a vapor-compression cycle to facilitate thermal energy transfer. In most sealed systems, an electric motor directly drives the compressor to compress a refrigerant. Notably, the compression process exerts a very uneven load on the motor. For example, during the compression part of the cycle the load torque increases dramatically, and after the high pressure gas is discharged the other half of the cycle has very little load. This variation in load torque causes variation in the rotor speed during the compression cycle, and thus lots of noise and vibration, especially at slow speed, such as during startup.

Accordingly, a sealed system that compensates for variations in load torque resulting from a compression cycle would be desirable. More particularly, a system and method for regulating the speed of the compressor motor to reduce noise, vibration, and excessive wear on sealed system components would be particularly beneficial.

BRIEF DESCRIPTION OF THE INVENTION

The present disclosure relates generally to a method of operating a compressor including obtaining a harmonic series representation of a periodic load torque exerted on the rotor as the rotor rotates through each revolution. The method includes regulating an electric motor to compensate for or cancel out the periodic load torque. Specifically, the method includes calculating an electromagnetic torque using a torque control input model based on the speed error and the harmonic series representation of the periodic load torque. The operation of the electric motor is then adjusted by pulling back or extra drive forward such that the motor speed is closer to constant and that noise and vibrations are minimized. Additional aspects and advantages of the invention will be set forth in part in the following description, or may be apparent from the description, or may be learned through practice of the invention.

In one exemplary embodiment, a method for operating a compressor comprising a rotor driven by an electric motor is provided. The method includes obtaining an angular speed of the rotor, obtaining a speed error by subtracting the angular speed from a reference angular speed, obtaining a harmonic series representation of a periodic load torque exerted on the rotor as the rotor rotates through each revolution, and calculating an electromagnetic torque using a torque control input model based on the speed error and the harmonic series representation of the periodic load torque. The method further includes operating the electric motor to generate the calculated electromagnetic torque on the rotor.

In another exemplary embodiment, a rolling piston compressor is provided including a casing defining a cylindrical cavity defining a central axis, a suction port, and a discharge port. An electric motor includes a drive shaft, the drive shaft extending along the central axis, and a rolling piston is positioned within the cylindrical cavity, the rolling piston being eccentrically mounted on the drive shaft. A sliding vane extends from the casing toward the rolling piston to maintain contact with the rolling piston as it rotates about the central axis, the sliding vane and the rolling piston dividing the cylindrical cavity into a suction volume in fluid communication with the suction port and a compression volume in fluid communication with the discharge port. A controller is operably coupled to the electric motor and is configured for obtaining an angular speed of the rolling piston, obtaining a speed error by subtracting the angular speed from a reference angular speed, and obtaining a harmonic series representation of a periodic load torque exerted on the rolling piston as the rolling piston rotates through each revolution. The controller is further configured for calculating an electromagnetic torque using a torque control input model based on the speed error and the harmonic series representation of the periodic load torque and operating the electric motor to generate the calculated electromagnetic torque on the rolling piston.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
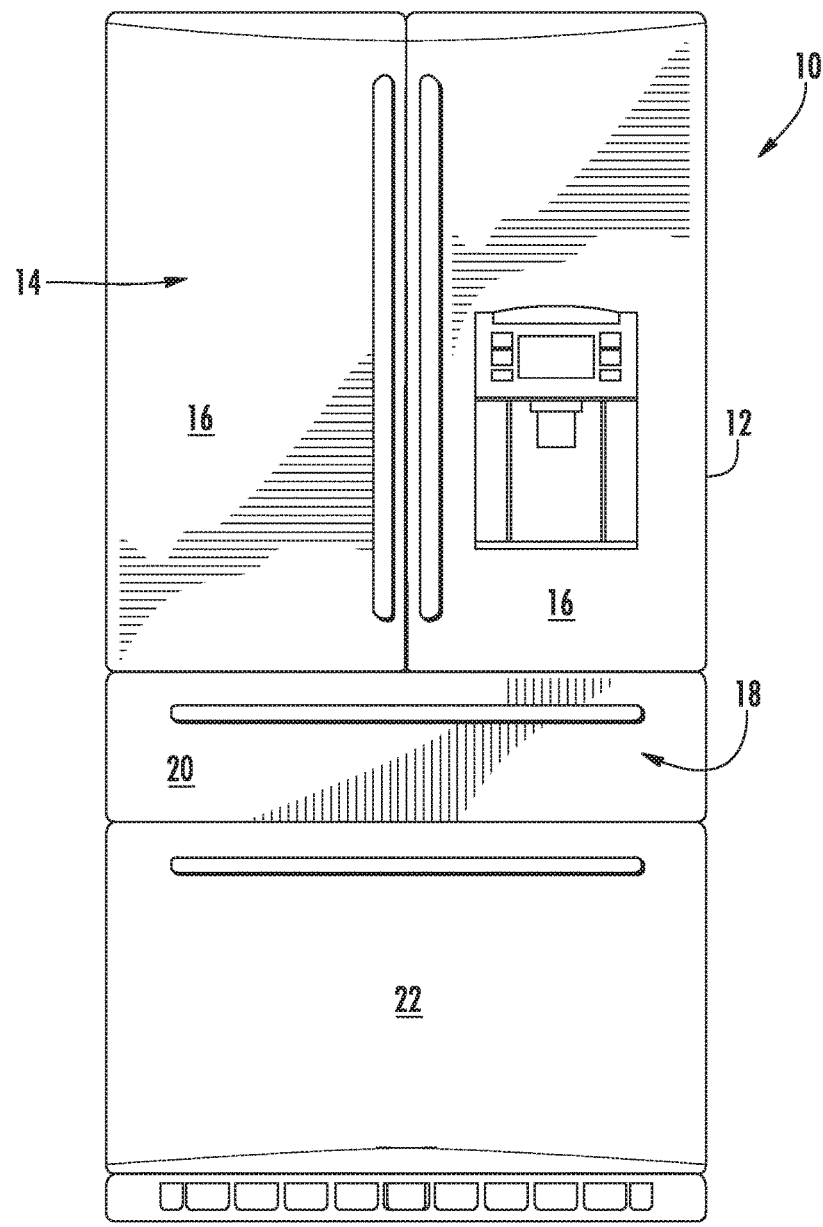
FIG. 1 is a front elevation view of a refrigerator appliance according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
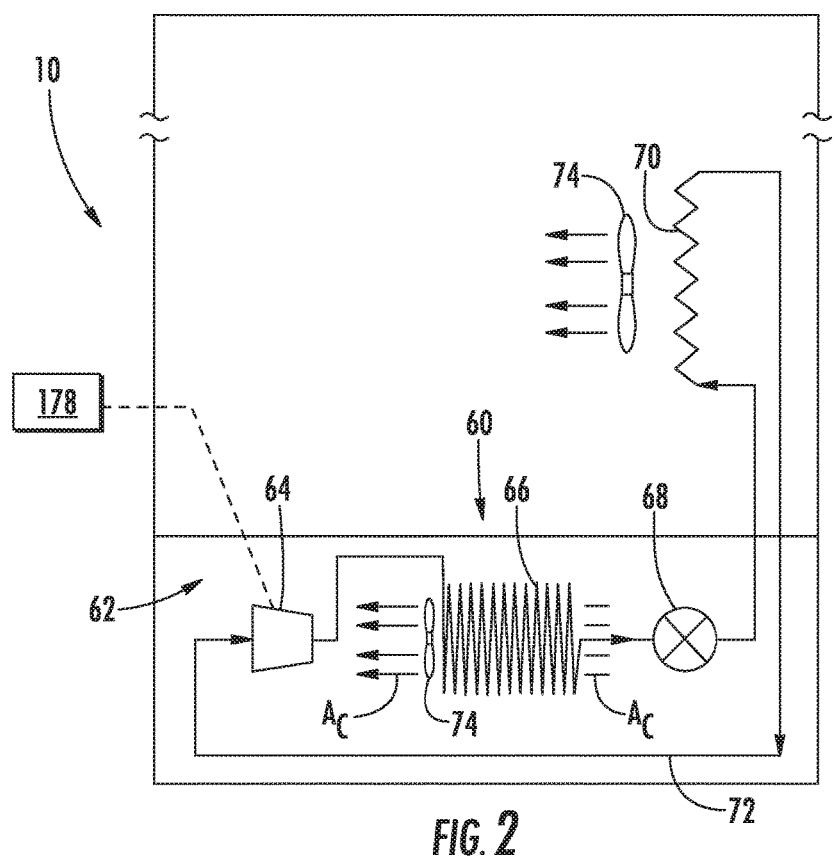
FIG. 2 is a schematic view of certain components of the example refrigerator appliance of FIG. 1.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in refrigerator appliances. Thus, the present subject matter may be used for any other suitable purpose, such as vapor compression within air conditioning units or air compression within air compressors.

In the illustrated example embodiment shown in FIG. 1, the refrigerator appliance 10 is depicted as an upright refrigerator having a cabinet or casing 12 that defines a number of internal chilled storage compartments. In particular, refrigerator appliance 10 includes upper fresh-food compartments 14 having doors 16 and lower freezer compartment 18 having upper drawer 20 and lower drawer 22. The drawers 20 and 22 are "pull-out" drawers in that they can be manually moved into and out of the freezer compartment 18 on suitable slide mechanisms.

FIG. 2 is a schematic view of certain components of refrigerator appliance 10, including a sealed refrigeration system 60 of refrigerator appliance 10. A machinery compartment 62 contains components for executing a known vapor compression cycle for cooling air. The components include a compressor 64, a condenser 66, an expansion device 68, and an evaporator 70 connected in series by fluid conduit 72 that is charged with a refrigerant. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 74 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device 68 (e.g., a valve, capillary tube, or other restriction device) receives refrigerant from condenser 66. From expansion device 68, the refrigerant enters evaporator 70. Upon exiting expansion device 68 and entering evaporator 70, the refrigerant drops in pressure. Due to the pressure drop and/or phase change of the refrigerant, evaporator 70 is cool relative to compartments 14 and 18 of refrigerator appliance 10. As such, cooled air is produced and refrigerates compartments 14 and 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well.

As described above, sealed refrigeration system 60 performs a vapor compression cycle to refrigerate compartments 14, 18 of refrigerator appliance 10. However, as is understood in the art, refrigeration system 60 is a sealed system that may be alternately operated as a refrigeration assembly (and thus perform a refrigeration cycle as described above) or a heat pump (and thus perform a heat pump cycle). Thus, for example, aspects of the present subject matter may similarly be used in a sealed system for an air conditioner unit, e.g., to perform by a refrigeration or cooling cycle and a heat pump or heating cycle. In this regard, when a sealed system is operating in a cooling mode and thus performs a refrigeration cycle, an indoor heat exchanger acts as an evaporator and an outdoor heat exchanger acts as a condenser. Alternatively, when the sealed system is operating in a heating mode and thus performs a heat pump cycle, the indoor heat exchanger acts as a condenser and the outdoor heat exchanger acts as an evaporator.

Figure 3:
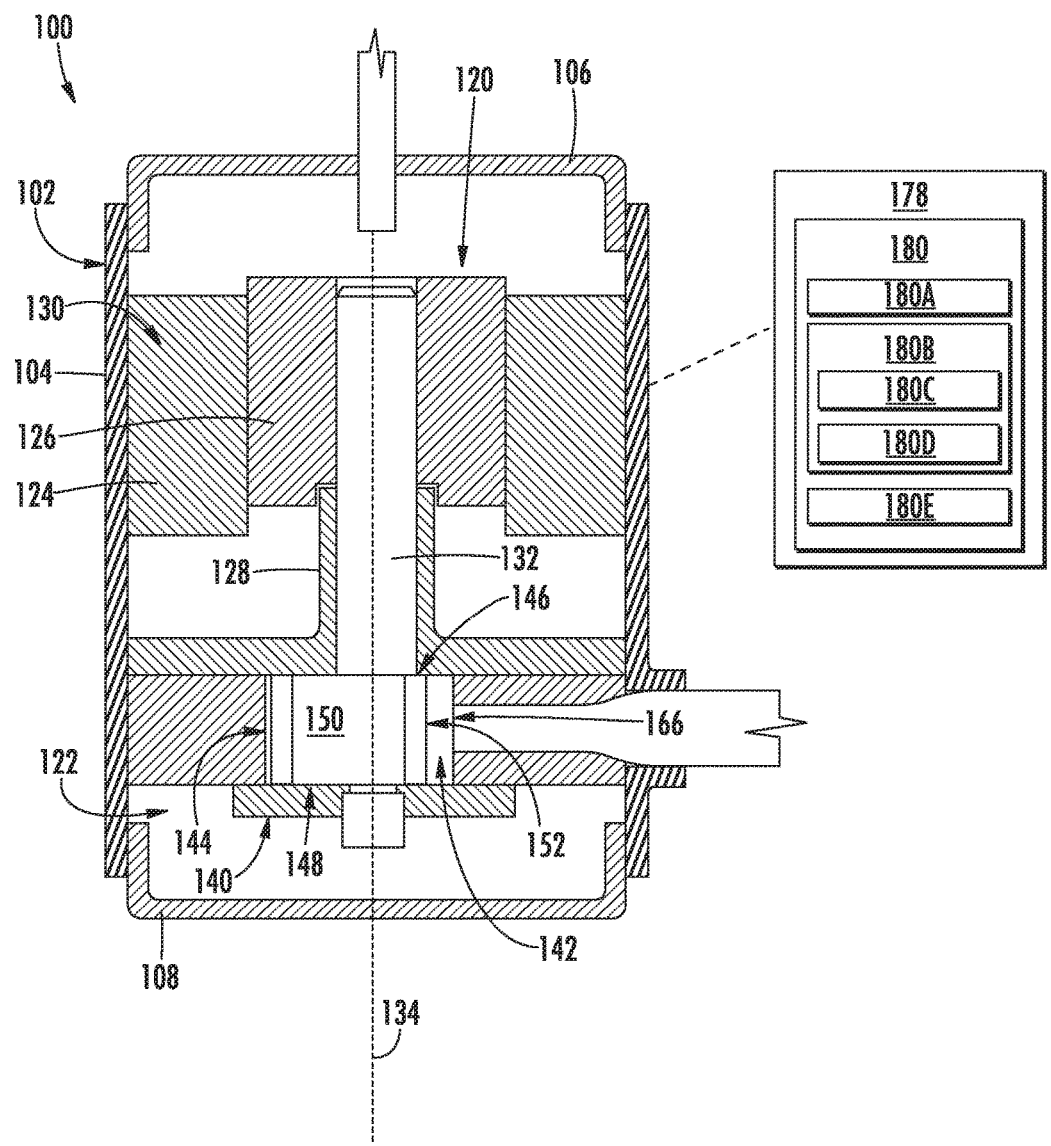
FIG. 3 is a cross sectional view of a rolling piston rotary compressor that may be used in the example refrigerator appliance of FIG. 1 according to an example embodiment of the present subject matter.

Referring now to FIG. 3, a compressor 100 will be described according to an exemplary embodiment of the present subject matter. Compressor 100 may be the same or similar to compressor 64 used in sealed refrigeration system 60. Alternatively, compressor 100 may be used in any other appliance or device for urging a flow of refrigerant through a sealed system. Moreover, it should be appreciated that aspects of the present subject matter may be adapted for use with other compressor types and configurations.

According to the illustrated exemplary embodiment, compressor 100 is a rolling piston rotary compressor including a housing 102 for containing various components of compressor 100. Housing 102 generally includes a cylindrical outer shell 104 that extends between a top shell 106 and a bottom shell 108. Housing 102 may generally form a hermetic or air-tight enclosure for containing compressor 100 components. In this manner, housing 102 generally keeps harmful contaminants outside housing 102 while preventing refrigerant, oil, or other fluids from leaking out of compressor 100.

Compressor 100 includes an electric motor 120 and a pump assembly 122 which are operably coupled and positioned within housing 102. More specifically, referring to FIG. 3, electric motor 120 generally includes a stator 124 positioned within housing 102 and a rotor 126 rotatably positioned within the stator 124. Stator 124 may be mechanically coupled within housing 102 (e.g., by one or more mechanical fasteners or through a compression fit) such that rotation relative to housing 102 is prevented. By contrast, rotor 126 is rotatably mounted using one or more bearings 128. When energized with the appropriate power, rotor 126 is caused to rotate while stator 124 remains fixed. For example, according to an exemplary embodiment, magnetic windings 130 are attached to stator 124. Each magnetic winding 130 may be formed from insulated conductive wire. When assembled, the magnetic windings 130 may be circumferentially positioned about rotor 126 to electromagnetically engage and drive rotation of rotor 122.

In addition, electric motor 120 may include a drive shaft 132 that extends from rotor 126, e.g., for driving pump assembly 122. Specifically, as illustrated, drive shaft 132 extends out of a bottom of rotor 126 along a central axis 134 and may be mechanically coupled to pump assembly 122. It should be appreciated that electric motor 120 may include any suitable type or configuration of motor and is not intended to be limited to the exemplary configuration shown and described herein. For example, the electric motor may be any other suitable AC motor, an induction motor, a permanent magnet synchronous motor, or any other suitable type of motor.

Figure 4:
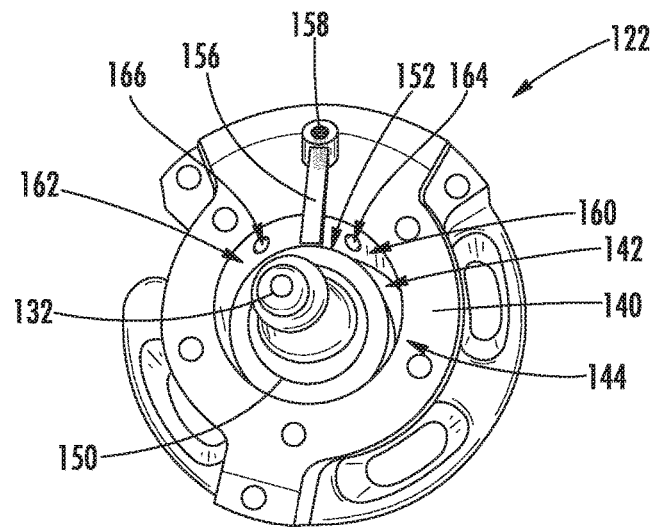
FIG. 4 provides a perspective cross sectional view of the exemplary rolling piston rotary compressor of FIG. 3.
Figure 5:
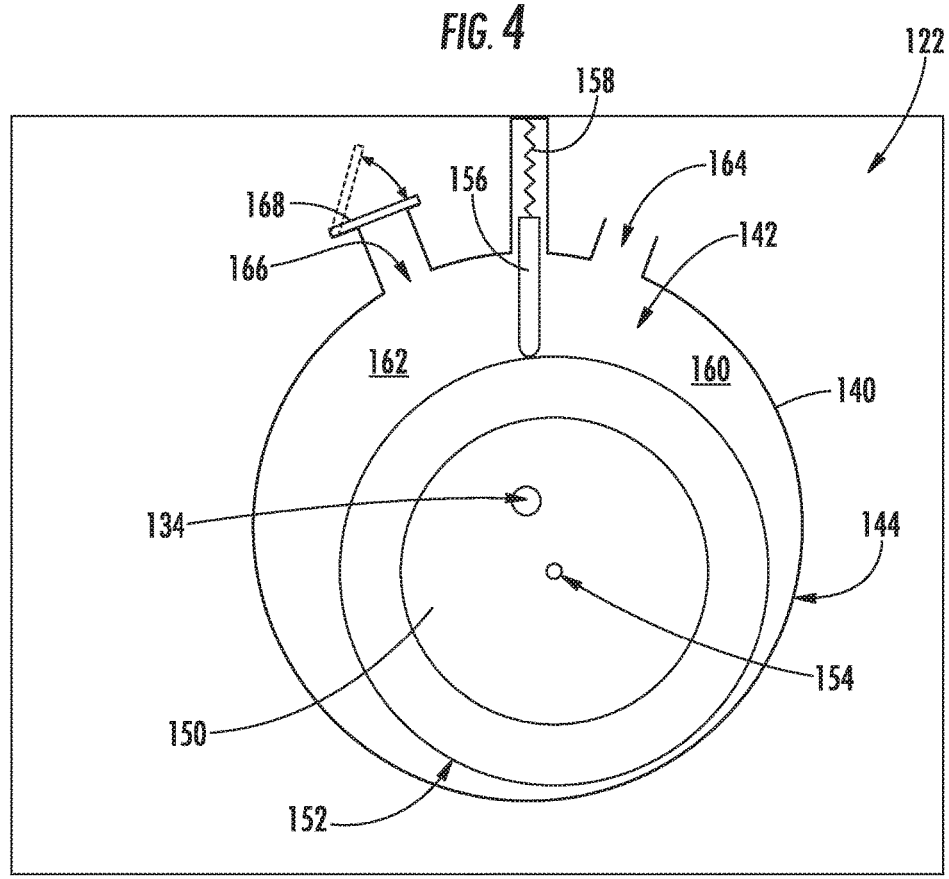
FIG. 5 provides a schematic, cross sectional view of the example rolling piston rotary compressor of FIG. 3.

Referring now to FIGS. 3 through 5, pump assembly 122 will be described in more detail according to an exemplary embodiment. As illustrated, pump assembly 122 is positioned within housing 102 and includes a casing 140 that defines a cylindrical cavity 142 within which the refrigerant compression occurs. Specifically, according to the illustrated embodiment, cylindrical cavity 142 defines a central axis which coincides with central axis 134 of drive shaft 132. Specifically, casing 140 may be formed from a cylindrical outer wall 144 that extends between a top wall 146 and a bottom wall 148 that are spaced apart along central axis 134.

As illustrated, a rolling piston 150 is positioned within cylindrical cavity 142 and is generally used for compressing refrigerant. Notably, rolling piston 150 may extend between top wall 146 and bottom wall 148 and define a cylindrical outer surface 152 that rolls along cylindrical outer wall 144 of casing 140. More specifically, rolling piston 150 is eccentrically mounted on drive shaft 132, e.g., such that a center of piston mass 154 is offset or not coincident with central axis 134.

In addition, pump assembly 122 includes a sliding vane 156 that extends from casing 140 toward rolling piston 150 to maintain contact with cylindrical outer surface 152 of rolling piston 150 as it rotates about central axis 134. Similar to rolling piston 150, sliding vane 156 generally extends between top wall 146 and bottom wall 148 of casing 140. Sliding vane 156 is urged into constant contact with rolling piston 150, e.g., using a spring element 158, such as a coiled mechanical spring.

In this manner, sliding vane 156 and rolling piston 150 divide cylindrical cavity 142 into a suction volume 160 and a compression volume 162. Casing 140 further defines a suction port 164 in fluid communication with suction volume 160 and a discharge port 166 in fluid communication with compression volume 162. In general, the rolling piston compressor 100 varies compression volume 162 while rolling piston 150 performs an eccentric rotary or orbiting motion in cylindrical cavity 142 about central axis 134. Sliding vane 156 maintains contact with cylindrical outer surface 152 to maintain a seal between suction volume 160 and compression volume 162.

Pump assembly 122 may further include a discharge valve 168 that is operably coupled to discharge port 166. In this manner, discharge valve 168 prevents the discharge of compressed refrigerant from compression volume 162 until a desired pressure is reached. In addition, discharge valve 168 may prevent the backflow of refrigerant into compression volume 162 from discharge port 166.

Operation of compressor 100 is controlled by a controller or processing device 178 (FIG. 3) that is operatively coupled to electric motor 120 for regulating operation of compressor 100, e.g., by selectively energizing electric motor 120. Specifically, controller 178 is in operative communication with the motor and may selectively energize stator 124 to drive rotor 126 and compress refrigerant as described above. Thus, controller 178 may generally be configured for executing selected methods of operating compressor 100, e.g., as described below. As described in more detail below, controller 178 may include a memory and microprocessor, such as a general or special purpose microprocessor operable to execute programming instructions or micro-control code associated with methods described herein. Alternatively, controller 178 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Compressor 100 and other components of the associated appliance may be in communication with controller 178 via one or more signal lines or shared communication busses.

FIG. 3 depicts certain components of controller 178 according to example embodiments of the present disclosure. Controller 178 can include one or more computing device(s) 180 which may be used to implement methods as described herein. Computing device(s) 180 can include one or more processor(s) 180A and one or more memory device(s) 180B. The one or more processor(s) 180A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 180B can include one or more non-transitory computer-readable storage medium(s), such as RAM, ROM, EEPROM, EPROM, flash memory devices, magnetic disks, etc., and/or combinations thereof.

The memory device(s) 180B can include one or more computer-readable media and can store information accessible by the one or more processor(s) 180A, including instructions 180C that can be executed by the one or more processor(s) 180A. For instance, the memory device(s) 180B can store instructions 180C for running one or more software applications, displaying a user interface, receiving user input, processing user input, etc. In some implementations, the instructions 180C can be executed by the one or more processor(s) 180A to cause the one or more processor(s) 180A to perform operations, e.g., such as one or more portions of methods described herein. The instructions 180C can be software written in any suitable programming language or can be implemented in hardware. Additionally, and/or alternatively, the instructions 180C can be executed in logically and/or virtually separate threads on processor(s) 180A.

The one or more memory device(s) 180B can also store data 180D that can be retrieved, manipulated, created, or stored by the one or more processor(s) 180A. The data 180D can include, for instance, data to facilitate performance of methods described herein. The data 180D can be stored in one or more database(s). In some implementations, the data 180D can be received from another device.

The computing device(s) 180 can also include a communication module or interface 180E used to communicate with one or more other component(s) of controller 178 or refrigerator appliance 10 over the network(s). The communication interface 180E can include any suitable components for interfacing with one or more network(s), including for example, transmitters, receivers, ports, controllers, antennas, or other suitable components.

Figure 6:
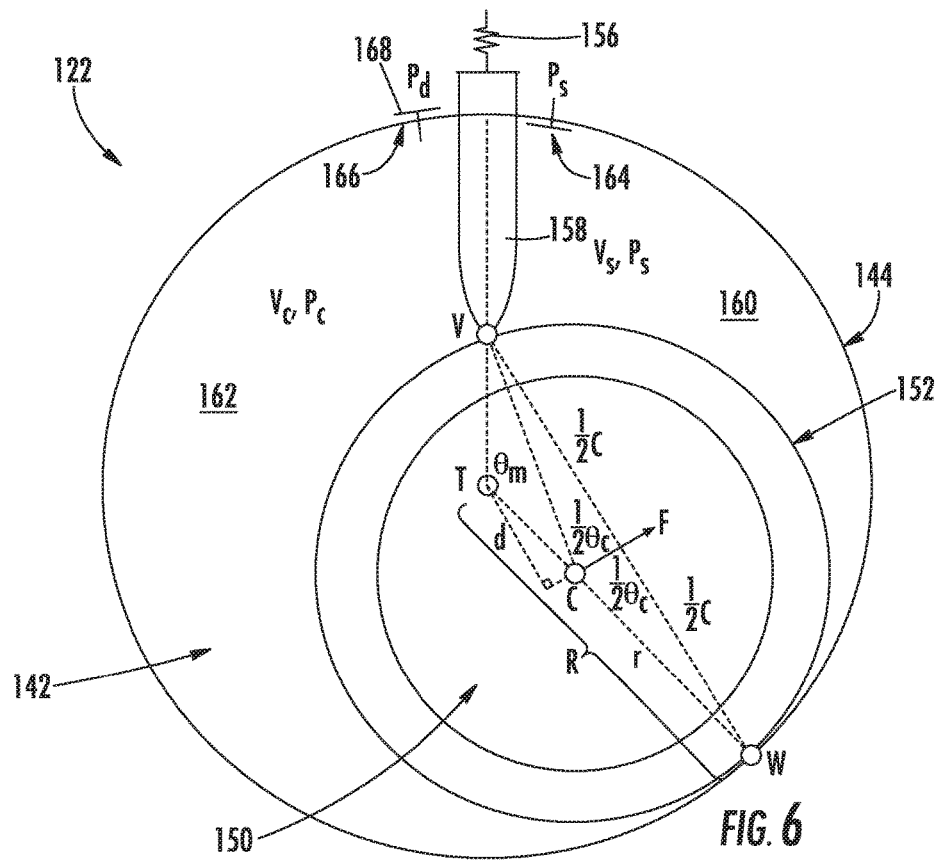
FIG. 6 provides a schematic, cross sectional view of the exemplary rolling piston rotary compressor including the geometric relationship and forces acting on the rolling piston.

Referring now specifically to FIG. 6, a schematic, cross sectional view of an exemplary rolling piston rotary compressor is provided. Specifically, FIG. 6 illustrates the geometric relationship between the eccentrically mounted rolling piston 150, the cylindrical cavity 142, and the sliding vane 156. Also illustrated are various forces exerted on rolling piston 150, along with an identification of the various chambers and their compression volumes. For convenience and to facilitate discussion below, a list of the system parameters associated with the load torque estimation observer is provided below in Table 1. However, it should be appreciated that fewer than all parameters may be listed here.

TABLE 1

List of Load Torque Estimation Observer Variables and Parameters

| Symbol | Parameter/Variable |
|---|---|
| $\theta_m, \omega_m, \dot{\omega}_m$ | Angle/speed/acceleration between the piston and the vane |
| T | axis of piston rotation (i.e., coincides with central axis 134) |
| C | center of piston mass |
| V | point of contact between piston and vane |
| W | point of contact between piston and wall |
| R | radius of compression chamber (i.e., cylindrical cavity 142) |
| r | radius of eccentrically mounted rolling piston 150 |
| $V_c$ | compression chamber volume (162) |
| $P_c$ | compression chamber pressure |
| $V_s$ | suction chamber volume (160) |
| $P_s$ | suction chamber pressure |
| $P_d$ | discharge pressure |

Various mathematical notations and accents are associated with variables or parameters used herein. Several of these notations and parameter conventions are described below according to an exemplary embodiment and using the example parameter x for simplifying discussion below. A dot accent (e.g., $\dot{x}$) denotes that this signal is a time derivative, i.e.

$$\dot{x} = \frac{dx}{dt}.$$

This signal may be integrated to obtain the original signal (plus initial conditions), i.e.

$$\int_0^t \dot{x}(\sigma) d\sigma = x(t) + x(0).$$

A hat accent (e.g., $\hat{x}$) denotes that this signal is an estimate or observer of the variable x. The term "estimate" is used when x is constant (or approximately so) and the term "observer" is used when x is time-varying. A tilde accent (e.g., $\tilde{x}$) denotes that this is an error signal. In the case of an estimator/observer error, $\tilde{x}$ is the difference between the estimate 2 and the actual signal x, i.e., $\tilde{x}=x-\hat{x}$. In addition, an arrow accent (e.g., $\vec{x}$) denotes that this is a vector signal (i.e., it has direction). As such this signal can be projected into constituent components on a given reference frame.

In addition, various operator conventions are used herein. Exemplary conventions are summarized here for simplicity of discussion. An $\triangleq$ operator denotes that the signal on the left-hand side of the equation is by definition equal to the terms on the right-hand side of the equation. This denotes that the given equation is not implicit from the model, but has been defined by the designer. Any user defined terms such as observers, estimators, and error signals will have an equation defining the form of those signals which uses $\triangleq$. The term 1/s is used to represent the standard Laplace integrator and may be commonly used in block diagrams to denote integration. In this regard, 1/s is an integrator notation used herein for simplicity, and that this may be replaced by standard time-domain integrated symbols, such as $$\int_0^t e(\sigma) d\sigma.$$

Referring still to FIG. 6, $\theta_m$ is measured as the angle between a first line that extends between an axis of piston rotation (T, i.e., which coincides with central axis 134) and a point of contact between the rolling piston and the vane (V) and a second line that extends between the axis of piston rotation T and a center of the piston mass (C) (e.g., also referred to by reference numeral 154). In addition, system parameters such as combined moment of inertia for the motor and piston (J), the specific heat ratio of the working gas or refrigerant (n), as well as all other geometric dimensions of the compressor are known. The positive unknown parameters such as the suction pressure ($P_s$) and the discharge pressure ($P_d$) are bounded and may be treated as constants such that the rate of change of the suction pressure ($\dot{P}_s$) and the rate of change of the discharge pressure ($\dot{P}_d$) are approximately equal to zero. It should be appreciated that as used herein, terms of approximation, such as "approximately," "substantially," or "about," refer to being within a ten percent margin of error.

During operation of compressor 100, rolling piston 150 is mounted to rotor 126 of electric motor 120 such that it rotates and translates within cylindrical cavity 142. Notably, rolling piston 150 is mounted off center from rotor 126, i.e., such that the drive axis of rotor 126 (i.e., central axis 134) is not coincident with center of piston mass 154 of rolling piston 150. In this manner, for example, as rolling piston 150 rotates clockwise, the compression volume $V_c$ decreases causing gas compression and the increase of the pressure in the compression chamber $P_c$. Simultaneously, additional refrigerant is pulled in through suction port 164 into the suction volume $V_s$ for compression during the next piston rotation.

Rolling piston 150 continues to compress the gas until the pressure in the compression chamber exceeds the discharge pressure $P_d$, when discharge valve (e.g., such as discharge valve 168) opens, allowing the pressurized gas to be expelled causing the pressure in the compression chamber $P_c$ to hold constant at the discharge pressure $P_d$ until top dead center is passed. In this regard, discharge valve 168 may be a one-way valve that has a cracking pressure equal to the discharge pressure $P_d$. Alternatively, any other suitable valve may be used to regulate the discharge of gas from the compression chamber.

As rolling piston 150 rotates, thereby compressing the gas in the compression chamber, it simultaneously expands the volume of the suction chamber $V_s$. This volume expansion creates a negative pressure that opens a suction valve or otherwise draws in new gas into the cylinder from the inlet conduit. Notably, when rolling piston 150 crosses top dead center (TDC), the compression volume $V_c$ reduces to zero and rolling piston 150 begins compressing what was formerly the volume of the suction chamber $V_s$ and a new suction volume $V_s$ begins increasing from zero as the rolling piston rotates through another rotation past TDC.

As explained briefly above, the compression process exerts a very uneven load on rolling piston 150 and thus electric motor 120 and compressor 100 in general. For example, during the compression part of the cycle the load torque increases dramatically, and after the high pressure gas is discharged the other half of the cycle has very little load. Specifically, referring briefly to FIG. 7, a plot illustrating the relationship between piston angle ($\theta_m$) of a rolling piston and a resulting load torque exerted on the rolling piston according to an exemplary embodiment of the present subject matter. Such a variation in load torque causes variation in the rotor speed during the compression cycle, and thus lots of noise and vibration, especially at slow speed, such as during startup. The methods described herein are intended at least in part to minimize such variations and vibrations.

Although the exemplary control methods described herein are intended to compensate for the cyclical or periodic load exerted on rolling piston 150 of compressor 100, it should be appreciated that aspects of the present subject matter may be applied to other types of compressors. In this regard, for example, the mechanical dynamics experienced by rolling piston 150 as shown in FIG. 6 may be determined for a linear compressor, another rotary compressor, etc. In addition, a plot similar to that shown in FIG. 7 may be determined for other types of compressors and the cyclical loading may be compensated for in a manner similar to that described herein. The load torque compensation techniques and other methods described herein are not intended to limit the scope of the present subject matter.

Figure 8:
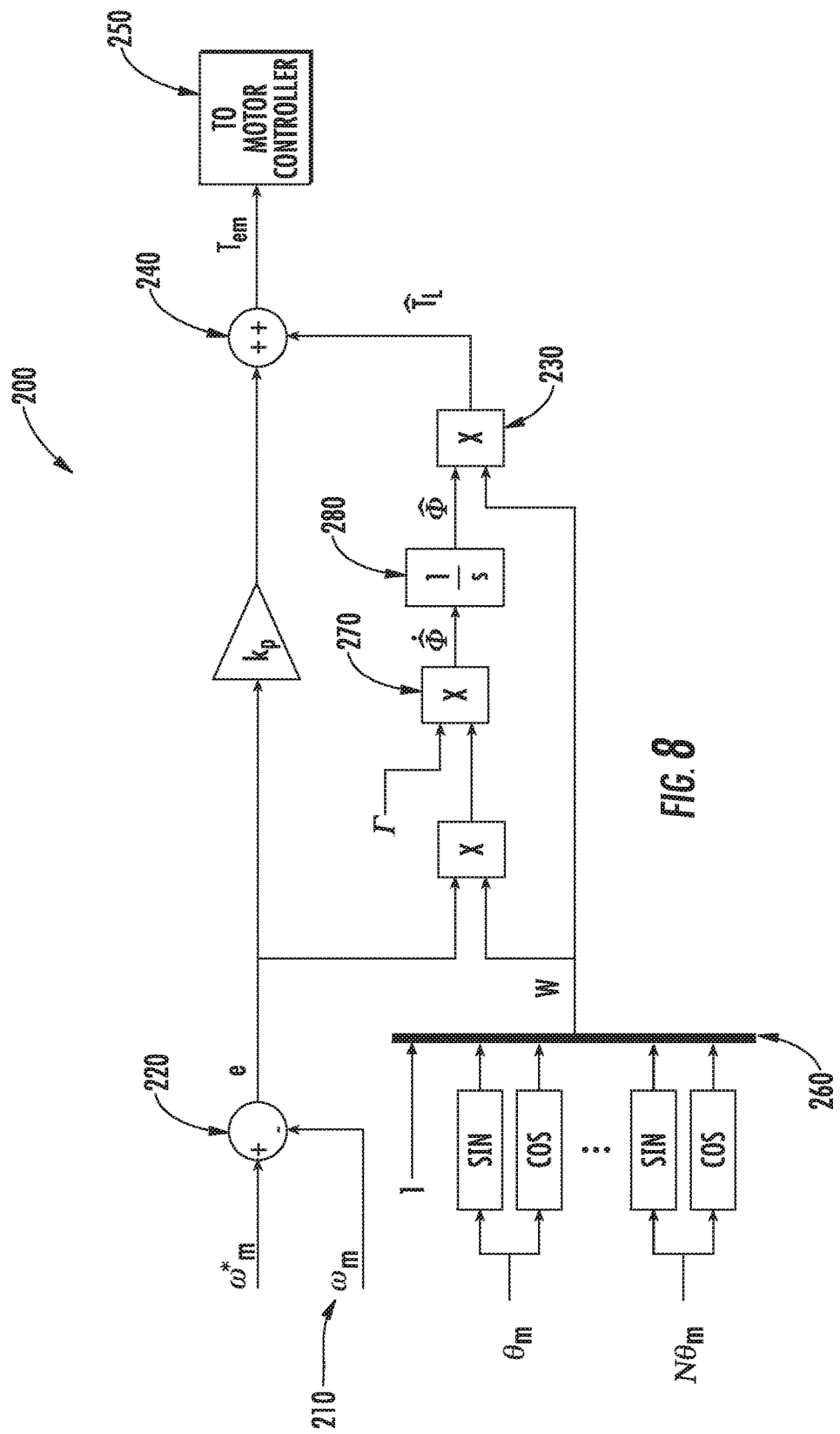
FIG. 8 provides an exemplary control schematic and method for regulating operation of the exemplary rolling piston rotary compressor of FIG. 3 according to an exemplary embodiment.

Referring now to FIG. 8, an exemplary control schematic or method 200 of operating a compressor will be described according to an exemplary embodiment of the present subject matter. Method 200 may be used to operate any suitable compressor. For example, method 200 may be used to operate rolling piston compressor 100 or may be adapted for controlling any other suitable compressor type and configuration. According to an exemplary embodiment, controller 178 of refrigerator appliance 10 may be programmed or configured to implement method 200. Thus, method 200 is discussed in greater detail below with reference to rolling piston compressor 100. Utilizing method 200, the motor of compressor 100 may be operating according to various control methods.

FIG. 8 and the associated description below provide an explanation and formulation of an adaptive load torque observer or model that may be used to implement method 200 and observe the load torque ($\hat{T}_L$) exerted on a compressor during operation. In addition, method 200 may use this observed load torque ($\hat{T}_L$) to determine a desired motor torque input ($T_{em}$) that facilitates the cancelling or compensation for the observed load torque ($\hat{T}_L$). In this regard, a suitable controller, such as an appliance controller or a dedicated motor controller, may be used to operate the drive motor such that the compressor operates to minimize speed variation, thereby reducing noise and vibrations during operation.

To simplify explanation of the formulation of the load torque estimation observer, certain steps in the formulation process may be omitted, particularly where the mathematics are simple or the derivation is implied. The description of the control algorithm and method 200 are intended to describe only a single method of formulating a load torque observer and regulating a compressor. According to alternative embodiments, assumptions may be made to simplify the calculation, e.g., where such an assumption simplifies the computational requirements of controller without sacrificing accuracy beyond a suitable degree.

As an initial matter, the general mechanical dynamic equation for compressor 100, or any other suitable compressor, is as follows:

$$J\dot{\omega}_m = T_{em} - T_L$$

where:
 J is the combined moment of inertia for the motor and piston;
 $T_{em}$ is the electromagnetic torque applied by the motor; and
 $T_L$ is the torque applied on the rolling piston by the load.

Notably, in order to ensure quiet operation of the compressor, it is desirable that the rotor (drive shaft) and rolling piston rotate at a constant speed. In other words, it is generally desirable to maintain the angular acceleration of the compressor equal to zero (i.e., $\dot{\omega}_m = 0$). Thus, considering the equation above, if the electromagnetic torque ($T_{em}$) may be regulated in a manner that cancels out the observed load torque ($\hat{T}_L$), the speed variance of the compressor can be minimized. In this manner, noise and vibration of the compressor may be minimized or eliminated altogether.

Figure 7:
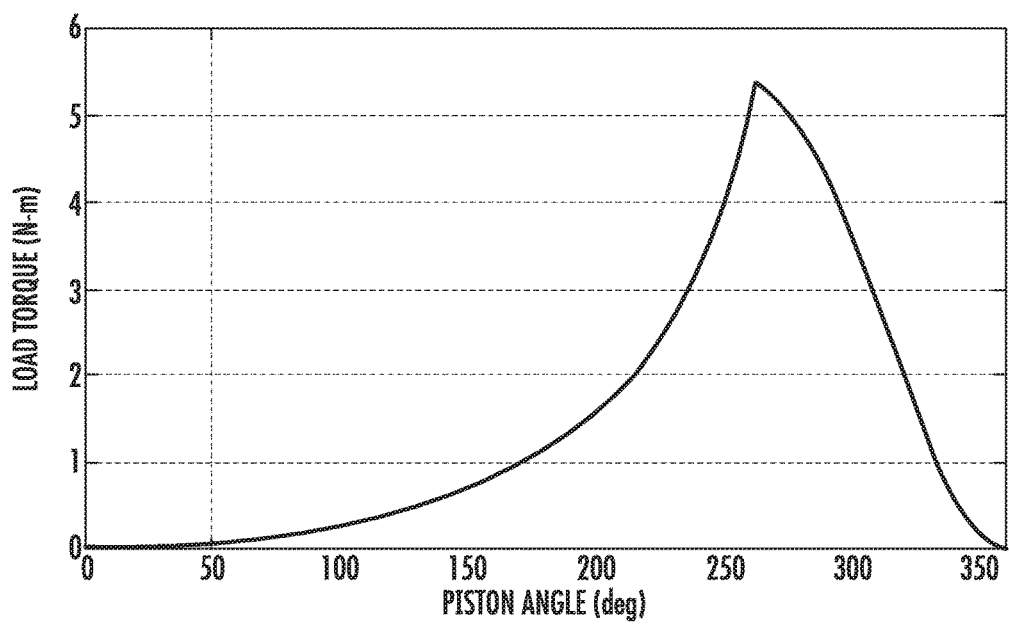
FIG. 7 provides a plot illustrating the relationship between a piston angle of a rolling piston and a resulting load torque exerted on the rolling piston according to an exemplary embodiment of the present subject matter.

However, given the highly nonlinear torque applied to the rolling piston, it is difficult to maintain $T_{em}$ the same as $T_L$. More specifically, as illustrated in FIG. 7, the torque load $T_L$ applied on the rolling piston varies non-linearly depending on the angular position of the rolling piston ($\theta_m$). Aspects of the present invention relate to developing and implementing an adaptive load torque observer, i.e., a model for determining or predicting the unknown periodic or cyclical load torque ($T_L$).

The adaptive load torque observer described herein relies on several assumptions about the compressor and the associated mechanical dynamics. Several of these assumptions are described below according to an exemplary embodiment. However, it should be appreciated that these assumptions may be manipulated or varied, other assumptions may be made, and other modifications may be made to the adaptive load torque observer model while remaining within the present subject matter. Several of the assumptions used in the modeling are described below.

For example, the load torque ($T_L$) is periodic with frequency equal to the angular velocity ($\omega_m$) of the compressor piston, which is assumed to be known. In this regard, it is assumed that the load is repetitive and repeats every revolution of the rotor or compressor piston. In addition, the load torque is bounded (has upper and lower limits) and has limited bandwidth (i.e., its harmonic content becomes negligible beyond some upper frequency limit). Moreover, it should be appreciated that the angular position, speed, and acceleration of the rolling piston is substantially equivalent to the angular position, speed, and acceleration of the rotor or drive shaft. Therefore, θ, ω, ω̇ may be used herein interchangeably to refer to the angular position, speed, and acceleration of the rolling piston and rotor.

Notably, particularly because of the periodic nature of the compressor load torque ($T_L$), the load profile is particularly suitable for representation using Fourier analysis. Specifically, Fourier analysis uses a series of sinusoidal functions to represent a complex periodic waveform, e.g., to simplify analysis of the cyclical load. Notably, the frequencies of the sinusoidal functions form a harmonic series. An exemplary harmonic series representation is provided below.

Using Fourier analysis, a periodic function such as the load torque ($T_L$) profile can be represented by a harmonic series of sinusoids, such as the infinite series shown below for the load torque ($T_L$) at a fundamental frequency ($\omega_m$).

$$T_L = a_0 + \sum_{n=1}^{\infty} [a_n \sin(n\theta_m) + b_n \cos(n\theta_m)]$$

where: $\theta_m = \int \omega_m$

In the above equation, $a_0$ is the magnitude of the DC component and $a_n, b_n$ are the amplitudes and of the sine and cosine terms, respectively, for the $n^{th}$ harmonic within the series.

Since the load torque ($T_L$) is bandwidth limited, a finite series representation may be used to represent the load torque ($T_L$) which includes only the first N harmonics. In this regard, by substituting N for $\infty$ in the equation above, the load torque may be represented as follows:

$$T_L = a_0 + \sum_{n=1}^{N} [a_n \sin(n\theta_m) + b_n \cos(n\theta_m)]$$

This form of the torque load equation may be written as a linear combination of unknown constants (e.g., $\Phi \in \mathbb{R}^{2N+1}$) and known sinusoids (e.g., $W^T \in \mathbb{R}^{1 \times 2N+1}$). Specifically, the load torque ($T_L$) may be represented as follows:

$$T_L = W\Phi$$

where:

$$W \triangleq [1 \; \sin\theta_m \; \cos\theta_m \; \ldots \; \sin(N\theta_m) \cos(N\theta_m)]$$

$$\Phi \triangleq [a_0 a_1 b_1 \ldots a_N b_N]^T$$

The form of the load torque equation above permits the use of adaptive methods to come up with estimates for the unknown coefficients denoted as $\hat{\Phi} \in \mathbb{R}^{2N+1 \times 1}$, as described below. These unknown coefficients ($\hat{\Phi}$) may then be used in the torque load equation above to obtain an observed torque load ($\hat{T}_L$).

Using the model described herein, a target compressor angular speed value or a reference speed ($\omega_m^*$) may be selected or input by a controller. Specifically, continuing the example above, reference speed $\omega_m^*$ may be the desired speed of compressor 100 to achieve the desired refrigerant flow and operation of sealed system 60. For example, reference speed $\omega_m^*$ may be set by a user or determined by controller 178 in response to one or more user inputs or system commands determined responsive to a measured temperature of compartments 14, 18.

Referring to FIG. 8, method 200 includes, at step 210, obtaining an angular speed of the rotor ($\omega_m$). The angular speed ($\omega_m$) may be measured or estimated utilizing any suitable method or mechanism. For example, a shaft speed encoder may measure the speed of the motor drive shaft, a tachometer may be used, or the back electromotive force (EMF) of the electric motor may be measured and used to determine $\omega_m$. Other suitable methods for determining $\omega_m$ are possible and may be used according to alternative embodiments of the present subject matter.

Notably, it is desirable to minimize the difference between the desired reference speed ($\omega_m^*$) and the actual angular speed ($\omega_m$). Thus, for the desired reference speed ($\omega_m^*$), step 220 may include determining the speed error (e) by subtracting the angular speed ($\omega_m$) from the reference angular speed ($\omega_m^*$). Specifically, the speed error (e) may be defined according to the following equation:

$$e = \omega_m^* - \omega_m$$

Notably, Lyapunov stability analysis motivates a particular form of the control input, or the electromagnetic torque ($T_{em}$) in order to ensure stability of operation. For brevity and simplicity of discussion, this analysis is not described here. According to an exemplary embodiment, the electromagnetic torque ($T_{em}$) may be a function of the observed load torque ($\hat{T}_L$) and the speed error (e). Specifically, a torque control input model should take the form of the following equation:

$$T_{em} \triangleq \hat{T}_L + k_p e$$

In the above equation, $k_p$ is a positive feedback gain and $\hat{T}_L$ is the observer of the periodic load torque based on the harmonic representation described above. Thus, referring again to FIG. 8, step 230 includes obtaining a harmonic series representation of a periodic load torque ($\hat{T}_L$) exerted on the rotor as it rotates through each revolution. Step 240 includes calculating an electromagnetic torque ($T_{em}$) using the above torque control input model based on the speed error (e) and the harmonic series representation of the periodic load torque ($\hat{T}_L$).

After the electromagnetic torque ($T_{em}$) is calculated, step 250 includes operating the electric motor to generate the calculated electromagnetic torque ($T_{em}$) on the rotor. As explained herein, it is desirable to adjust the electromagnetic torque ($T_{em}$) applied by the motor of the compressor to be substantially equivalent to the load torque ($T_L$) to reduce angular acceleration or speed variation. However, although the motor torque ($T_{em}$) is an output of the control algorithm and method described herein, it should be appreciated that the actual control input to the motor is a stator voltage and current. Thus, according to an exemplary embodiment, a separate controller (which could be either a torque or current controller) could be configured for adjusting the supply voltage to the compressor motor to achieve the desired torque input ($T_{em}$). For example, the separate torque input controller could be another PI controller, or could comprise any other suitable control algorithm.

As explained above, step 230 includes obtaining a harmonic series representation of the periodic load torque ($\hat{T}_L$). According to an exemplary embodiment, using the load torque equation above, the adaptive load torque observer for obtaining the harmonic series representation of the periodic load torque ($\hat{T}_L$) may be represented as follows:

$$\hat{T}_L \triangleq W\hat{\Phi}$$

The harmonic coefficient estimates ($\hat{\Phi}$) are defined according to the following update law:

$$\dot{\hat{\Phi}} \triangleq \Gamma W^T e$$

In the above equation, $\Gamma \in \mathbb{R}^{2N+1}$ is a positive diagonal gain matrix. In this manner, according to an exemplary embodiment, a separate gain may be used for each harmonic if desired. Specifically, Γ may be defined as follows:

$$\Gamma = \begin{bmatrix} k_{\Phi_0} & \cdots & 0 \\ \vdots & \ddots & \vdots \\ 0 & \cdots & k_{\Phi_n} \end{bmatrix}$$

Referring again to FIG. 8, method 200 further includes, at step 260, obtaining the known sinusoids (W) representing the periodic torque load ($\hat{T}_L$) to N harmonics. The number of harmonics (N) modeled may vary depending on the application and the accuracy required.

In order to obtain the harmonic coefficient estimates ($\hat{\Phi}$), method 200 further includes, at step 270, obtaining the rate of change of the estimates ($\dot{\hat{\Phi}}$) using the parameter update law described above. In addition, step 280 includes integrating the rate of change of the estimates ($\dot{\hat{\Phi}}$) to obtain the harmonic coefficient estimates ($\hat{\Phi}$). As specified in the equations above and in FIG. 8, the harmonic coefficient estimates ($\hat{\Phi}$) may then be multiplied by the known sinusoids (W) to obtain the periodic torque load ($\hat{T}_L$) according to an exemplary embodiment.

FIG. 8 depicts an exemplary control method and models having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using rolling piston rotary compressor 100 as an example, it should be appreciated that these methods may be applied to the operation of any suitable compressor type and configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a compressor comprising a rotor driven by an electric motor, the method comprising:
   obtaining an angular speed of the rotor;
   obtaining a speed error by subtracting the angular speed from a reference angular speed;
   obtaining a harmonic series representation of a periodic load torque exerted on the rotor as the rotor rotates through each revolution;
   calculating an electromagnetic torque using a torque control input model based on the speed error and the harmonic series representation of the periodic load torque; and
   operating the electric motor to generate the calculated electromagnetic torque on the rotor.

2. The method of claim 1, wherein the torque control input model comprises:

$$T_{em} \triangleq \hat{T}_L + k_p e$$

where:
   $T_{em}$ is the electromagnetic torque applied by the electric motor;
   $\hat{T}_L$ is an observer of the periodic load torque;
   e is the speed error (e=$\omega_m^* - \omega_m$); and
   $k_p$ is a real, positive gain value.

3. The method of claim 1, wherein the harmonic series representation of the periodic load torque is defined as:

$$T_L = W\Phi$$

where:
   $T_L$ is the periodic load torque;
   W includes known sinusoids of the harmonic series representation; and
   Φ is a linear combination of sinusoidal coefficients.

4. The method of claim 3, wherein the harmonic series representation of the periodic load torque includes only a first N harmonics, the first N harmonics being represented by the following equations:

$$W \triangleq [1 \; \sin\theta_m \; \cos\theta_m \; \ldots \; \sin(N\theta_m)\cos(N\theta_m)]; \text{ and}$$

$$\Phi \triangleq [a_0 a_1 b_1 \ldots a_N b_N]^T;$$

where:
   $\theta_m$ is an angular position of the rotor; and
   $a_N$, $b_N$ are amplitudes of sine and cosine terms for the $n^{th}$ harmonic.

5. The method of claim 1, wherein estimates of sinusoidal coefficients ($\hat{\Phi}$) are obtained by integrating the rate of change of estimates ($\dot{\hat{\Phi}}$), the rate of change of constants ($\dot{\hat{\Phi}}$) being determined according to a parameter update law.

6. The method of claim 5, wherein the parameter update law for determining the rate of change of the estimates ($\dot{\hat{\Phi}}$) comprises:

$$\dot{\hat{\Phi}} \triangleq \Gamma W^T e$$

where:

$$\Gamma = \begin{bmatrix} k_{\Phi_0} & \cdots & 0 \\ \vdots & \ddots & \vdots \\ 0 & \cdots & k_{\Phi_n} \end{bmatrix};$$

$$W \triangleq [1 \; \sin\theta_m \; \cos\theta_m \; \ldots \; \sin(n\theta_m) \; \cos(n\theta_m)];$$

and
   $k_{\Phi_n}$ are real, positive gain values associated with the $n^{th}$ harmonic.

7. The method of claim 1, wherein obtaining an angular speed of the rotor comprises:
   measuring the angular speed using a tachometer or an encoder.

8. The method of claim 1, wherein the electromagnetic torque is regulated to minimize an angular acceleration of the rotor.

9. The method of claim 1, wherein the compressor is a rolling piston compressor or a linear compressor.

10. The method of claim 1, wherein the compressor is used to compress a refrigerant in a sealed system of a refrigerator appliance.

11. A rolling piston compressor comprising:
   a casing defining a cylindrical cavity defining a central axis, a suction port, and a discharge port;
   an electric motor comprising a drive shaft, the drive shaft extending along the central axis;

a rolling piston positioned within the cylindrical cavity, the rolling piston being eccentrically mounted on the drive shaft;

a sliding vane that extends from the casing toward the rolling piston to maintain contact with the rolling piston as it rotates about the central axis, the sliding vane and the rolling piston dividing the cylindrical cavity into a suction volume in fluid communication with the suction port and a compression volume in fluid communication with the discharge port; and a controller operably coupled to the electric motor, the controller configured for:
 obtaining an angular speed of the rolling piston;
 obtaining a speed error by subtracting the angular speed from a reference angular speed;
 obtaining a harmonic series representation of a periodic load torque exerted on the rolling piston as the rolling piston rotates through each revolution;
 calculating an electromagnetic torque using a torque control input model based on the speed error and the harmonic series representation of the periodic load torque; and
 operating the electric motor to generate the calculated electromagnetic torque on the rolling piston.

12. The rolling piston compressor of claim 11, wherein the torque control input model comprises:

$$T_{em} \triangleq \hat{T}_L + k_p e$$

where:
 $T_{em}$ is the electromagnetic torque applied by the electric motor;
 $\hat{T}_L$ is an observer of the periodic load torque;
 e is the speed error ($e = \omega_m^* - \omega_m$); and
 $k_p$ is a real, positive gain value.

13. The rolling piston compressor of claim 11, wherein the harmonic series representation of the periodic load torque is defined as:

$$T_L = W\Phi$$

where:
 $T_L$ is the periodic load torque;
 W includes known sinusoids of the harmonic series representation; and
 $\Phi$ is a linear combination of sinusoidal coefficients.

14. The rolling piston compressor of claim 13, wherein the harmonic series representation of the periodic load torque includes only a first N harmonics, the first N harmonics being represented by the following equations:

$$W \triangleq [1\ \sin\theta_m\ \cos\theta_m\ \ldots\ \sin(N\theta_m) \cos(N\theta_m)];\ \text{and}$$

$$\Phi \triangleq [a_0 a_1 b_1 \ldots a_N b_N]^T;$$

where:
 $\theta_m$ is an angular position of the rolling piston; and
 $a_N, b_N$ are amplitudes of sine and cosine terms for the $n^{th}$ harmonic.

15. The rolling piston compressor of claim 11, wherein estimates of sinusoidal coefficients ($\hat{\Phi}$) are obtained by integrating the rate of change of estimates ($\dot{\hat{\Phi}}$), the rate of change of constants ($\dot{\hat{\Phi}}$) being determined according to a parameter update law.

16. The rolling piston compressor of claim 15, wherein the parameter update law for determining the rate of change of the estimates ($\hat{\Phi}$) comprises:

$$\dot{\hat{\Phi}} \triangleq \Gamma W^T e$$

where:

$$\Gamma = \begin{bmatrix} k_{\Phi_0} & \cdots & 0 \\ \vdots & \ddots & \vdots \\ 0 & \cdots & k_{\Phi_n} \end{bmatrix};$$

$$W \triangleq [1\ \sin\theta_m\ \cos\theta_m\ \ldots\ \sin(n\theta_m)\ \cos(n\theta_m)\ ];$$

and
 $k_{on}$ are real, positive gain values associated with the $n^{th}$ harmonic.

17. The rolling piston compressor of claim 11, wherein obtaining an angular speed of the rolling piston comprises:
 measuring the angular speed using a tachometer or an encoder.

18. The rolling piston compressor of claim 11, wherein the electromagnetic torque is regulated to minimize an angular acceleration of the rolling piston.

19. The rolling piston compressor of claim 11, wherein the rolling piston compressor is used to compress a refrigerant in a sealed system of a refrigerator appliance.

* * * * *